United States Patent [19]

Badger

[11] Patent Number: 4,632,411

[45] Date of Patent: Dec. 30, 1986

[54] SHOPPING CART WITH PLASTIC BASKET

[75] Inventor: Ronald L. Badger, Battle Creek, Mich.

[73] Assignee: United Steel & Wire Company, Battle Creek, Mich.

[21] Appl. No.: 729,323

[22] Filed: May 1, 1985

[51] Int. Cl.[4] ............................................. B62B 3/02
[52] U.S. Cl. .......................................... 280/33.99 R
[58] Field of Search ................. 280/33.99 R, 33.99 A, 280/33.99 H, 33.99 S

[56] References Cited

U.S. PATENT DOCUMENTS

| | | | |
|---|---|---|---|
| 3,829,114 | 8/1974 | Cohen et al. ................ | 280/33.99 R |
| 3,844,577 | 10/1974 | Wahl ............................ | 280/33.99 R |
| 3,999,774 | 12/1976 | Rehrig ......................... | 280/33.99 R |
| 4,046,394 | 9/1977 | Thompson, Jr. ............. | 280/33.99 B |
| 4,097,056 | 6/1978 | Castellano ................ | 280/33.99 R X |
| 4,123,077 | 10/1978 | Joseph ................... | 280/33.99 R X |
| 4,273,346 | 6/1981 | Rehrig .......................... | 280/33.99 F |

OTHER PUBLICATIONS

Photograph of Rehrig Mini-Cart.
Rehrig brochure re: Cart #1200-10.
Rehrig brochure re: Cart #200-10.

Primary Examiner—John J. Love
Assistant Examiner—Michael Mar
Attorney, Agent, or Firm—Flynn, Thiel, Boutell & Tanis

[57] ABSTRACT

A shopping cart having a wheeled base assembly constructed primarily from metal tubing, a separate handle assembly constructed from metal tubing and projecting upwardly adjacent the rear of the base assembly, and a basket assembly having a one-piece plastic basket rigidly secured to the base and handle assemblies. The bottom wall of the basket has a rear edge reinforcing member extending therealong and defining a longitudinally extending groove which opens downwardly. A horizontal support tube extends transversely of the cart adjacent the rear of the base and is rigidly connected across the legs of the handle assembly. This support tube is disposed within the groove for supporting the rear edge of the basket bottom wall. The base has an upright extending transversely thereacross intermediate the ends thereof, which upright supportingly engages a transversely extending portion integrally associated with the basket bottom wall. This transverse upright extends outwardly to engage the bottom wall directly under the basket side walls. The basket side walls have rear reinforcing edges which engage and are secured to the upright legs of the handle assembly.

13 Claims, 9 Drawing Figures

SHOPPING CART WITH PLASTIC BASKET

FIELD OF THE INVENTION

This invention relates to a shopping cart and, in particular, to an improved cart employing a plastic basket mounted on a metal base.

BACKGROUND OF THE INVENTION

In recent years there has been an increased demand for shopping carts constructed of plastic materials. Several attempts have been made to provide an all plastic cart, namely both a plastic basket and base (U.S. Pat. No. 4,046,394), although such attempts have for the most part been unsuccessful in view of the inability to provide a satisfactory base.

Accordingly, in an ongoing effort, several carts have been developed which employ a plastic basket mounted on a metal base. In some instances the base has been of conventional construction, and in other instances bases of rather radical design have been developed. Examples of carts employing a plastic basket mounted on a metal base are illustrated in U.S. Pat. Nos. 3,844,577, 3,999,774, 4,123,077 and 4,273,346.

While several carts employing plastic baskets mounted on a metal base have been commercialized and are presently being utilized, some of which are illustrated by the above-mentioned patents, nevertheless these known carts possess structural or functional features which make their use less than desirable. For example, in most of the carts employing a plastic basket mounted on a somewhat conventional metal base, it has been observed that the basket exhibits a structural weakness inasmuch as the center support on the base does not extend fully to the edge of the basket, and hence the side walls of the basket tend to bow and/or sag. Attempts to resolve this problem have taken many different directions, including providing the basket with significant reinforcement. These known attempts, however, have been less than satisfactory.

The mounting of the basket on the base has also presented a formatable problem in view of the difficulty in obtaining a secure and strong connection of the plastic basket to the metal base. Attempts have been made to provide special receptacles on the basket for telescopic relationship with the base, such as illustrated by U.S. Pat. No. 3,844,577. Another attempt has involved the use of a wire loop as a tensioning member for surrounding the upper edge of the basket and the uprights of the handle for attaching the basket to the base, as illustrated by U.S. Pat. No. 3,999,774. While this latter arrangement is actively utilized, nevertheless it does involve the fabrication of a special wire loop mounted in surrounding relationship to the basket so as to securely mount the basket to the base. Many of these known arrangements have been rather expensive to fabricate and assemble, and this has hence detracted from the wide scale adoption and use of such carts.

Accordingly, it is an object of this invention to provide an improved cart employing a plastic basket mounted on a metal base, which cart overcomes many of the above-mentioned disadvantages in that it permits the basket to be molded economically of a plastics material and then mounted on the base utilizing assembly steps which are simple to perform. Further, the base can be economically manufactured by use of conventional metal tubing, specifically steel tubing welded together, with the base being designed to provide desirable support for the basket both along the rear edge and centrally across the bottom wall up to the side walls, thereby preventing undesirable distortion of the basket.

A further object of the invention is to provide an improved cart, as aforesaid, wherein the upright handle is fabricated from a single U-shaped tube and is provided with a crossbar welded between the lower free ends thereof, which crossbar functions as an attachment and a support for the lower rear edge of the basket. The crossbar additionally permits the handle to be releasably attached by removable fasteners to an underlying crosstube on the base to facilitate not only the assembly of the base and handle, but also the assembly and/or disassembly of the basket relative to the base and handle.

Still another object of the invention is to provide an improved cart, as aforesaid, wherein the plastic basket is molded as an integral one-piece structure having front, side and bottom walls, with the rear of the basket being open so as to permit use of a conventional baby seat formed from wire rod if desired. The separate handle of U-shaped structure is provided for attachment to the rear edges of the basket side walls, and the U-shaped handle has a separate crosstube welded between the lower free ends thereof, whereby the handle provides a substantial connecting structure and a very substantial rigidifying structure for the side walls of the basket. In addition, the base has a rear U-shaped support tube which projects upwardly for connection to the handle, which support tube has a crosstube which underlies the crosstube of the handle and is fixed thereto, as by removable fasteners. This double crosstube arrangement as provided under the lower rear edge of the basket not only provides support for the rear edge of the basket bottom wall, as by means of a telescopic support therewith, but also provides both the base and the overall cart with substantial strength and rigidity. This double crosstube arrangement as provided at the rear edge of the basket, and specifically the upper crosstube, also effectively functions as a stop for contacting the front support bar under the basket of a rearward cart when two such carts are nested together. This hence provides a secure stop for limiting the amount of nesting between carts to prevent the plastic baskets from being tightly wedged together, and avoids the necessity of having to provide a molded stop on the basket.

Other objects and purposes of the invention will be apparent to persons familiar with cart structures of this general type upon reading the following specification and inspecting the accompanying drawings.

Figure 1:
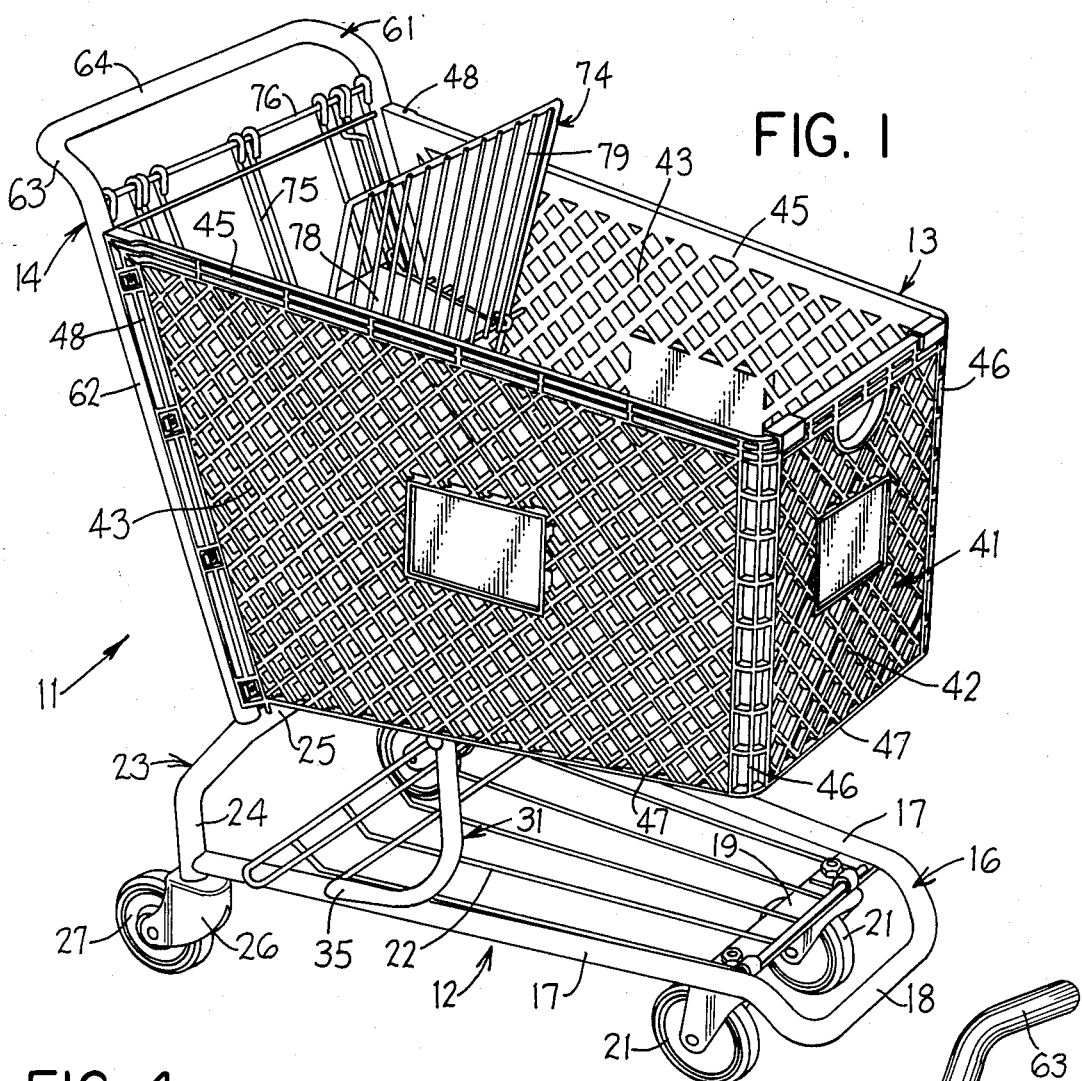
FIG. 1 is a perspective view of the improved cart according to the present invention.
Figure 4:
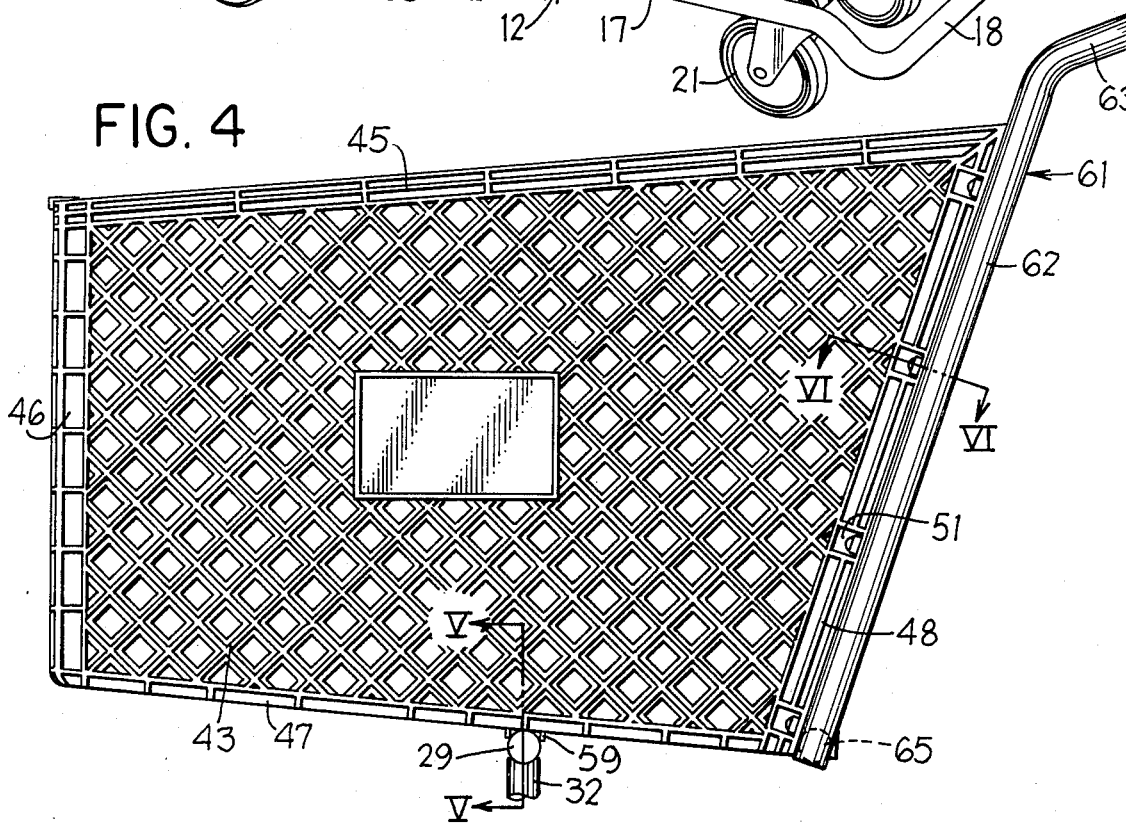
FIG. 4 is a side elevational view of the plastic basket showing its attachment to the handle assembly and its partial attachment to the base assembly.
Figure 2:
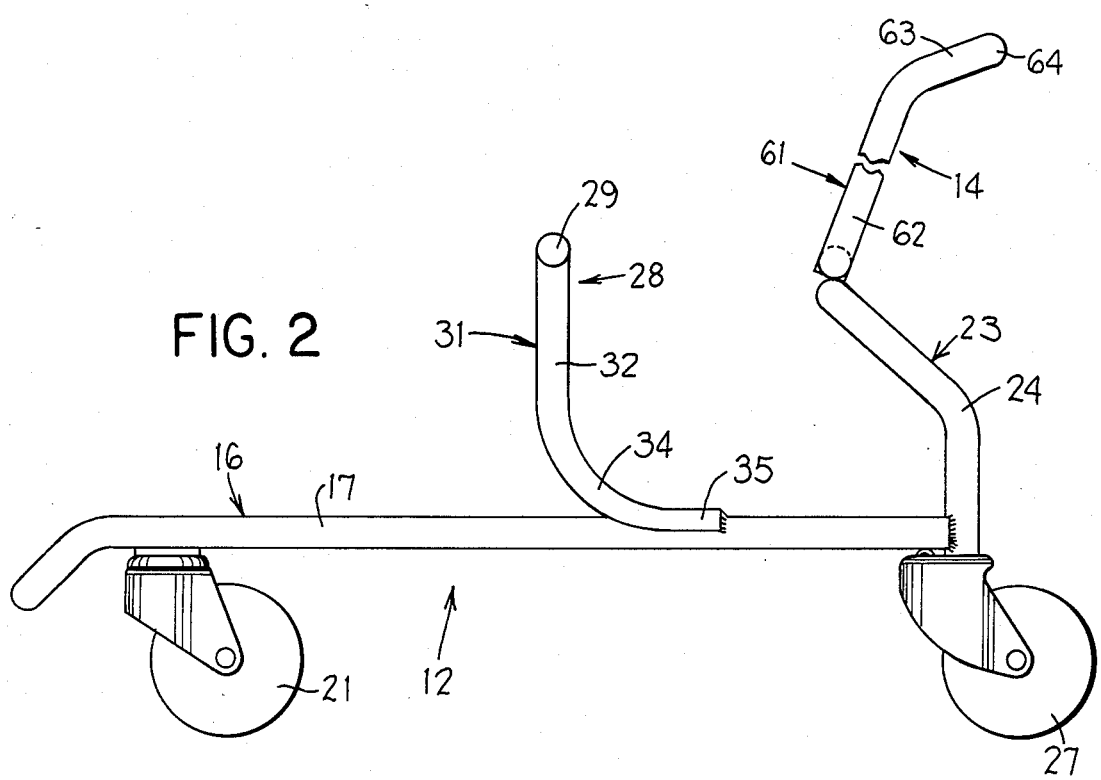
FIG. 2 is a side elevational view of the base assembly.
Figure 3:
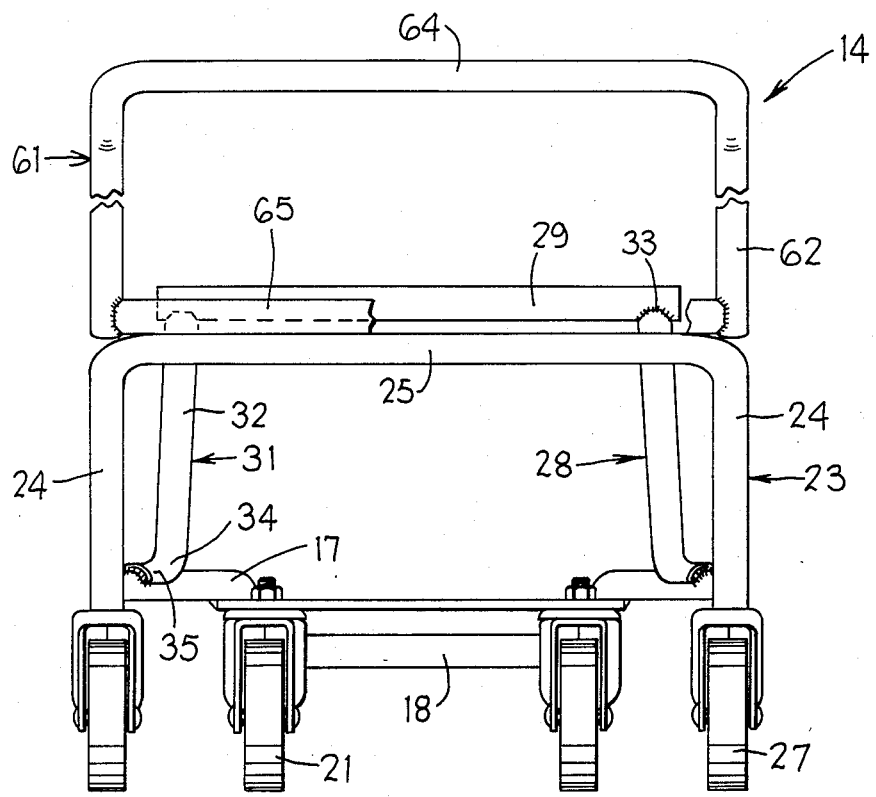
FIG. 3 is a elevational view illustrating the rear or handle end of the base assembly as shown in FIG. 2.
Figure 8:
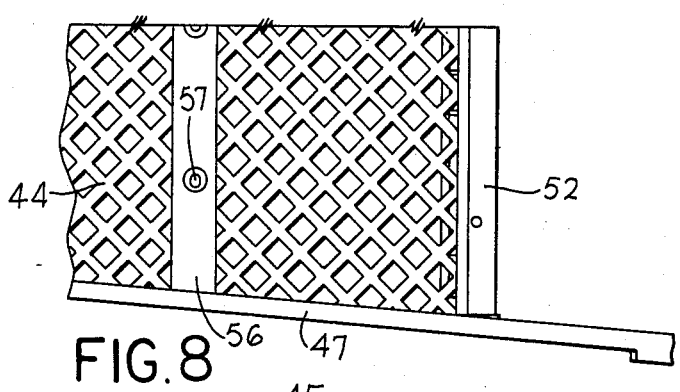
FIG. 8 is a fragmentary top view of the portion of the basket shown in FIG. 7.
Figure 7:
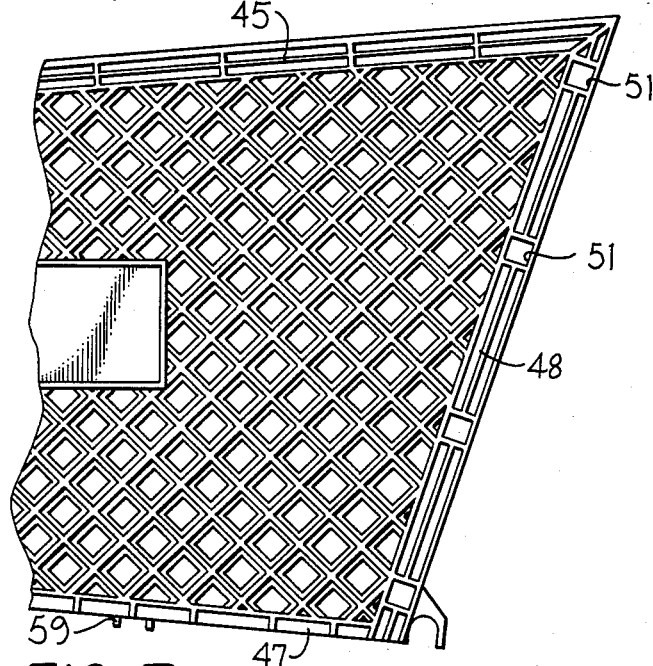
FIG. 7 is a fragmentary side elevational view showing solely a fragmentary portion of the plastic basket.
Figure 6:
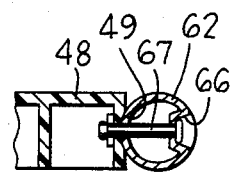
FIGS. 5 and 6 are fragmentary sectional views taken substantially along lines V—V and VI—VI respectively, in FIG. 4.

Certain terminology will be used in the following description for convenience in reference only and will not be limiting. For example, the words "upwardly", "downwardly", "rightwardly" and "leftwardly" will refer to directions in the drawings to which reference is made. The word "forward" will refer to the end of the cart which is remote from the handle, namely the rightward end as appearing in FIG. 1, and the word "rear" will refer to the opposite or handle end of the cart. The words "inwardly" and "outwardly" will refer to directions toward and away from, respectively, the geometric center of the cart and designated parts thereof. Said terminology will include the words specifically mentioned, derivatives thereof, and words of similar import.

DETAILED DESCRIPTION

Referring to the drawings, FIG. 1 illustrates a cart 11 according to the present invention, which cart is of the type typically utilized in supermarkets, department stores and the like. This cart includes a wheeled base assembly 12 which supports thereon a basket assembly 13. A handle assembly 14 is fixedly joined between the basket and base assemblies.

Considering first the base assembly 12, same includes a conventional U-shaped base member 16 which is formed in one piece of tubular material and includes a pair of rearwardly projecting side legs 17 joined together at their forward ends by a bight 18. This bight 18 is spaced downwardly from the plane of the side leg 17, as is conventional, and the side legs themselves diverge as they project rearwardly to permit nesting of like carts. The legs 17, adjacent their forward ends, are joined together by a wheel support plate 19 which extends transversely therebetween, and this plate in turn supports a pair of sidewardly spaced front casters 21. The U-shaped base member 16 also supports a conventional bottom tray 22, the latter being typically formed of wire rod.

Base assembly 12 includes a rear U-shaped upright 23 which is preferably formed in one piece by being bent from tubular material. This rear upright 23 includes a pair of spaced upright legs 24 which, at their upper ends, are joined together by a horizontal crosstube 25, the latter being positioned directly under the rear edge of the basket bottom wall so as to support same. The legs 24 of the rear upright 23 project upwardly and somewhat forwardly as is standard in carts of this type, and these legs 24 at their lower ends are fixedly secured to horns 26 which rotatably support rear wheels 27. The rear legs 24, directly above the horns 26, have the rear ends of the legs 17 fixed thereto, as by welding.

Figure 5:
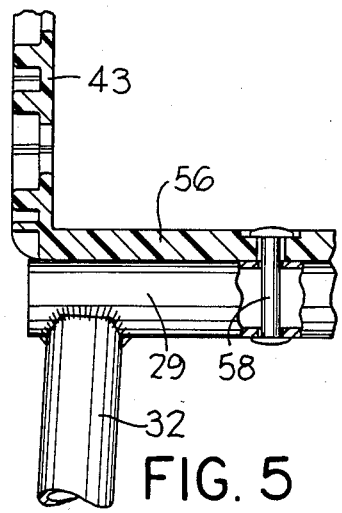

Base assembly 12 also includes a front U-shaped upright 28, which functions as a basket support. This upright 28 is positioned centrally of the base between the front and rear ends, and extends transversely across the base to provide transverse support for the bottom wall of the basket substantially midway between the front and rear ends thereof. This front upright 28, while being of a downwardly-directed U-shaped configuration, is preferably fabricated from three separate elements. More specifically, this upright 28 includes a top crosstube 29 which extends transversely across the base and is adapted to directly supportingly engage the bottom wall of the basket substantially midway between the front and rear ends thereof. This crosstube 29 has a length which substantially corresponds to the width of the basket bottom wall so that the tube 29 has end portions thereof positioned in supportive engagement directly under the side walls of the plastic basket, substantially as illustrated by FIG. 5.

The front upright 28 also includes two identical upright legs 31 which fixedly and rigidly support the top crosstube 29 in upwardly spaced relationship from the base member 16. Each of these legs 31 is substantially L-shaped and includes a substantially vertical leg portion 32 which projects upwardly and is fixedly joined to the top crosstube 29 in the vicinity of the respective free end thereof. To provide a secure connection, the upper end of the vertical leg portion 32 is preferably provided with a notch or saddle cut therein so as to effectively conform to the cylindrical configuration of the crosstube 29, with the leg portion 32 then being appropriately welded at 33 to the crosstube 29. The leg portion 32 joins to the crosstube 29 at a location which is spaced inwardly a small distance from the free end of the latter so that the vertical leg portion 32 projects directly upwardly from the base leg 17 to provide proper loadbearing support. The upright 31 has an intermediate bend 34 so as to result in the formation of a substantially horizontal leg portion 35 which projects rearwardly and directly overlies the base leg 17. This horizontal leg portion 35 is appropriately flattened into a substantially semi-circular configuration so as to more snugly overlie the base leg 17, with the legs 17 and 35 being fixedly joined together as by welding.

Considering now the basket assembly 13, same includes a basket member 41 which is molded in one piece entirely of a plastics material. This plastic basket 41 includes a front wall 42 which is joined to a pair of side walls 43, which latter walls diverge as they project rearwardly so as to permit nesting of baskets associated with like carts as is conventional. These front and side walls 42 and 43, respectively, are integrally joined together by a bottom wall 44, the latter being slightly sloped downwardly as it projects rearwardly so as to permit the aforementioned nesting.

The one-piece basket 41 has a reinforcing top rib 45 which extends in a continuous U-shaped configuration along the front and side walls. Vertically extending corner elements 46 are integrally molded for joining the front wall to the adjacent side walls. Similar continuous reinforcing members 47 extend along the lower edges of the front and side walls for integrally joining the latter to the bottom wall 44. These members 45-47 are substantially solid, whereas the front, side and bottom walls 42-44 are preferably of a meshlike configuration. The meshlike configuration of the front and side walls preferably has a T-shaped cross section.

The side walls 43 each have a reinforcing member 48 which extends longitudinally along the length of the rear edge thereof. This reinforcing member 48, on the rear side thereof, is provided with a shallow concave recess 49 which extends longitudinally along the reinforcing member 48 so as to define a contour which will snugly embrace the circular contour of the handle assembly, as described hereinafter. Each reinforcing member 48 also has a plurality of pockets 51 formed therein at longitudinally spaced intervals, which pockets accommodate fastening elements for connecting the basket to the hereinafter described handle assembly.

The bottom wall 44 of the plastic basket is provided, along the rear free edge thereof, with a rear edge reinforcing member 52. This member 52 extends continuously across the bottom wall and is joined to the reinforcing members 48 adjacent the lower ends thereof. The rear edge reinforcing member 52 projects slightly upwardly above the upper surface of the bottom wall 44 and defines a forwardly facing shoulder 53. This rear edge reinforcing member 52 also defines therein a recess 54 which extends longitudinally along the member and opens downwardly of the basket. This recess 54, at the closed upper end thereof, is provided with a substantially semicircular cross section which hence defines a substantially semicylindrical support wall adapted to snugly seat the reinforcing member 48 on the handle assembly as hereinafter described.

The opposite ends of this reinforcing member 52 are appropriately joined to the reinforcing members 48 by anglelike gusset plates 55.

The one-piece plastic basket 41 is also provided with a solid reinforcing plate 56 formed integrally of the bottom wall 44. This reinforcing plate 56 is located substantially midway between the front and rear edges of the bottom wall, and extends transversely across the bottom wall so as to join in with the ribbed edge members 47. The reinforcing plate 56 is adapted to be positioned directly over and supportingly engaged with the crosstube 29 of the base assembly. An appropriate plurality of holes 57, normally three, are formed at spaced intervals through the reinforcing plate 56, which holes 57 align with similar holes which extend through the top crosstube 29. Appropriate fasteners such as rivets 58 extend through these aligned holes for rigidly joining the reinforcing plate 56 to the top crosstube 29, substantially as illustrated by FIG. 5.

The reinforcing plate 56 is also preferably provided with a pair of substantially parallel guide flanges 59 which project downwardly therefrom, which guide flanges extend transversely across the basket so as to effectively straddle the top crosstube 29 to assist in positioning the basket on the base assembly.

Considering now the handle assembly 14, same includes a downwardly-directed U-shaped handle member 61 which is preferably formed by being bent from the single elongated tubular element. This handle member 61 includes a pair of approximately parallel elongated legs 62 which have a length so as to extend along and project upwardly above the rear edges of the basket side walls. These legs 62, at their upper ends, are provided with rearwardly offset parts 63, and these offsets 63 are integrally joined together by a transversely extending crosstube 64, the latter defining the handle or grip for the cart.

Handle assembly 14 also includes a lower crosstube 65 which extends perpendicularly across the handle member and is rigidly joined to the legs 62 adjacent the lower free ends thereof. The crosstube 65 has the ends thereof fixed to the legs 62 by welding so that the handle assembly 14 hence comprises a single rigid loop of substantially rectangular shape. The lower crosstube 65 extends substantially parallel to the upper crosstube or grip 64.

The handle assembly 14 is initially assembled to the base assembly 12 by positioning the lower crosstube 65 of the handle assembly directly on top of the crosstube 25 associated with the rear upright 23. These superimposed crosstubes 65 and 25 have aligned openings therethrough, and appropriate fasteners such as threaded bolts 71 extend therethrough for rigidly joining these tubes 25 and 65 together. A plurality of such fasteners 71 are disposed at longitudinally spaced intervals along the tubes. The upper side of tube 65 preferably has enlarged openings 72 therethrough to permit access to the fasteners and positioning of the fastener heads within the interior of the upper tube 65.

Figure 9:
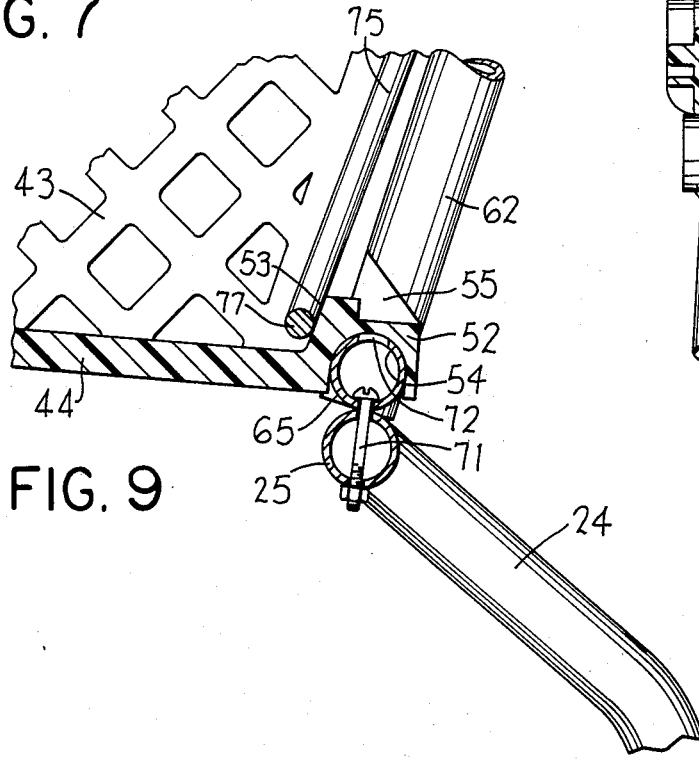
FIG. 9 is an enlarged fragmentary sectional view illustrating the lower rear edge of the basket and handle structure, and the attachment of the handle assembly to the base assembly.

After the handle assembly 14 has been rigidly affixed to the base assembly 12 as explained above, the one-piece plastic basket 41 is then positioned on the base assembly and fixedly attached to both the base and handle assemblies. This is accomplished by first positioning the rear edge reinforcing member 52 such that the crosstube 65 is snugly disposed within the recess 54 as illustrated in FIG. 9. At the same time, the bottom reinforcing plate 52 rests on the front crosstube 29. The rivets 58 are then extended through the reinforcing plate 56 and the front crosstube 29 to rigidly secure the basket directly to the base assembly. Additional rivets 67 extend through each of the handle legs 62 at a plurality of longitudinally spaced locations, which rivets 67 extend through the handle and the adjacent reinforcing member 48 for fixedly securing the handle to the rear edge of each basket side wall throughout substantially the complete length of the latter. The handle leg 62 is preferably provided with an appropriate depression 66 therein so as to accommodate the head of the rivet 67.

In addition to the one-piece plastic basket member 41 described above, the basket assembly 13 also includes a conventional baby seat assembly 74 for closing off the open rear wall of the basket. This baby seat assembly 74 is constructed of wire and includes a rear wall 75 which at its upper end is hingedly supported on a cross wire 76 which extends transversely between the handle legs 62. This rear wall 75 projects downwardly so that the lower cross wire 77 thereof abuts the shoulder 53 defined on the front face of the rear edge reinforcing member 52. The rear wall 75 also supports thereon a conventional baby seat 78 and a seat back 79, both of which collapse so as to be substantially parallel with the rear wall 75. When the baby seat 75 is in this collapsed position, it can swingably move upwardly about the cross wire 76 into a raised position so as to permit the baskets of like carts to be nested.

The structure and operation of the baby seat assembly 74 is conventional and well known so that further description thereof is believed unnecessary.

The cart 11 of the present invention will readily internest with a like cart in a conventional manner. During the nesting of one cart within another, the front top crosstube 29 of the rear cart will abut against the rear crosstube 65 (and more specifically the rear edge reinforcing member 52) of the front cart so as to limit the extent to which the baskets of two carts can internest one within another, and hence prevent the baskets from becoming tightly wedged together.

Due to the manner in which the rear edges of the basket side walls 43 are attached to the handle legs 62, and the provision of the rear edge reinforcing member 52 and its support directly on the lower handle crosstube 65, the rear edge of the basket is hence securely supported and restrained so as to not deform out of shape due to loading of the basket. Further, the reinforcing members 47 which extend along the lower edges of the basket side walls are supported directly on the front top crosstube 29 which, coupled with the reinforcing plate 56 which extends across the bottom wall of the basket and is supported on the tube 29, hence provides the basket with substantial rigidity so as to resist deformation due to loading of the basket.

While the basket is illustrated as attached to the base and handle assemblies by rivets, it will be appreciated that other types of fasteners such as screws or bolts could be utilized if desired. Further, even the riveted connections permit the basket to be interchanged inasmuch as the rivets can be cut so as to permit a new basket to be mounted on the base, with new rivets being used for securing the basket to the base and handle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A shopping cart comprising:
   a wheeled base assembly including a substantially U-shaped base member provided with front and rear pairs of rollers mounted thereon, and a substantially U-shaped basket support fixed to and projecting upwardly from said base member substantially midway between the front and rear ends thereof, said U-shaped basket support including a top substantially horizontally extending support element which extends transversely of said base member and a pair of upright legs which are fixed to said support element adjacent the opposite ends thereof and project downwardly for fixed securement to the legs of said U-shaped base member;
   a handle assembly fixed to said base assembly adjacent the rearward end thereof and projecting upwardly therefrom, said handle assembly including a downwardly directed substantially U-shaped handle member having a horizontal and substantially transversely extending handle part which at opposite ends is fixed to a pair of downwardly projecting elongated legs which at their lower ends are fixedly interconnected to said base assembly;
   an upwardly opening basket assembly mounted on and fixedly connected to said base and handle assemblies, said basket assembly including a one-piece plastic basket member having a pair of upright side walls fixedly and integrally joined to bottom and front walls which extend therebetween;
   a reinforcing portion formed integrally with and extending transversely across the bottom wall of said basket member substantially midway between the front and rear ends thereof, said reinforcing portion being positioned directly over and supportingly engaged on said support element, and fastener means extending between said support element and said reinforcing portion for fixedly securing same together;
   said base assembly including a rear substantially U-shaped upright which is fixed to the rear end of said U-shaped base member and extends transversely thereacross, said rear U-shaped upright including a rear cross member which extends substantially horizontally and transversely between the legs of said base member and is spaced upwardly a substantial distance thereabove; and
   said handle assembly including a lower cross member which extends transversely between and is fixedly connected to the legs of said handle member substantially adjacent the lower free ends thereof, said lower cross member being positioned approximately directly over and in abutting engagement with the rear cross member, said lower and rear cross members extending generally parallel with one another, and means for fixedly and rigidly securing said lower and rear cross members together.

2. A cart according to claim 1, wherein the support element extends transversely across the bottom wall of said basket member and has a length such that the support element is provided with end portions which are disposed directly under and supportingly engage the lower edges of the basket member side walls.

3. A cart according to claim 2, wherein the U-shaped basket support is fabricated from three parts which are integrally welded together, the first one of said parts comprising an elongated tubular element which comprises said support member, said second and third ones of said parts being identical and each comprising a substantially L-shaped element having an upright leg part which at its upper end is welded to said support member adjacent but spaced inwardly a small distance from the free end thereof, said L-shaped element being provided with a rounded bend intermediate the ends thereof and having a lower substantially horizontal leg which projects rearwardly and directly overlies and is fixedly welded to the leg of said U-shaped base member.

4. A cart according to claim 1, wherein said basket member is provided with a rear edge reinforcing member fixed to and extending longitudinally along the rear free edge of said bottom wall, said rear edge reinforcing member defining therein a downwardly opening groove sized to snugly accommodate said lower cross member, and said rear edge reinforcing member being positioned over and in downwardly bearing engagement with said lower cross member so that said lower cross member is snugly positioned within said groove.

5. A cart according to claim 4, including a plurality of fasteners disposed at spaced intervals longitudinally along said rear edge reinforcing member for fixedly securing said rear edge reinforcing member to said lower cross member.

6. A cart according to claim 5, including an elongated reinforcing edge part integral with and extending along the rear edge of each said side wall of said basket member, said reinforcing edge part being disposed in abutting engagement with a respective one of the elongated legs of said handle member, and a plurality of fasteners disposed at spaced intervals longitudinally along said leg for fixedly securing said leg to the respective reinforcing edge part of the basket member side wall.

7. A cart according to claim 1, including an elongated reinforcing edge part integral with and extending along the rear edge of each said side wall of said basket member, said reinforcing edge part being disposed in abutting engagement with a respective one of the elongated legs of said handle member, and a plurality of fasteners disposed at spaced intervals longitudinally along said leg for fixedly securing said leg to the respective reinforcing edge part of the basket member side wall.

8. A shopping cart comprising:
   an upwardly opening basket assembly including a one-piece plastic basket member having a pair of upright side walls fixedly and integrally joined to bottom and front walls which extend therebetween, the bottom wall of said basket member having a reinforcing member integrally fixed to and extending transversely thereacross adjacent the rear free edge thereof;

a wheeled base assembly having said basket assembly fixedly mounted thereon, said base assembly including a substantially U-shaped base member provided with front and rear pairs of rollers mounted thereon, and a basket support fixed to and extending substantially horizontally transversely across and supportingly engaging the underside of said bottom wall of said basket member approximately midway between the front and rear edges thereof;

a handle assembly fixed to said base assembly and said basket assembly adjacent the rearward ends thereof, said handle assembly including a rigid one-piece handle member having a horizontal and substantially transversely extending handle part which is positioned in the vicinity of the rear upper edge of the basket member and which at opposite ends is fixed to a pair of downwardly projecting elongated legs which are fixedly interconnected to said base assembly, said handle member also having a horizontal and substantially transversely extending lower cross member which extends generally parallel to and is spaced downwardly a substantial distance from said handle part and has opposite ends thereof rigidly joined to said elongated legs, said lower cross member cooperating with the elongated legs and the handle part to define a rigid ringlike loop of generally rectangular configuration, said lower cross member being positioned directly under and supportingly engaged with the reinforcing member associated with the bottom wall of said basket member; and said base assembly also including a rear cross member extending transversely across the U-shaped base member adjacent the rear end thereof in upwardly spaced relationship therefrom, said rear cross member extending parallel with and positioned approximately directly under and in abutting engagement with the lower cross member of said handle member, said lower and rear cross members being fixedly and rigidly secured together.

9. A cart according to claim 8, wherein a plurality of fasteners secure the rear edges of said basket side walls and bottom wall to the elongated legs and lower cross member respectively.

10. A cart according to claim 9, wherein each said side wall of said basket member has an elongated reinforcing edge part integral with and extending along the rear edge thereof and disposed in abutting engagement with a respective one of the elongated legs of said handle member, and a plurality of said fasteners being disposed at spaced intervals longitudinally along said leg for fixedly securing said leg to the respective reinforcing edge part.

11. A cart according to claim 9, wherein a plurality of said fasteners are disposed at spaced intervals longitudinally along the rear edge reinforcing member for fixedly securing said reinforcing member to said lower cross member.

12. A cart according to claim 8, wherein the lower cross member projects transversely between and is fixedly connected to said elongated legs directly adjacent the lower ends thereof, and wherein said handle member is directly fixedly secured to said base assembly solely by a plurality of fasteners which rigidly and fixedly join the lower and rear cross members at a plurality of locations spaced longitudinally therealong.

13. A cart according to claim 8, wherein each said side wall of said basket member has an elongated reinforcing edge part integral with and extending along the rear edge of the respective side wall, said reinforcing edge part being disposed in abutting engagement with a respective one of the elongated legs of said handle member, and a plurality of fasteners disposed at spaced intervals longitudinally along said leg for fixedly securing said leg to the respective reinforcing edge part.

* * * * *